(12) United States Patent
Blanchet et al.

(10) Patent No.: US 9,915,004 B2
(45) Date of Patent: Mar. 13, 2018

(54) SYSTEM AND METHOD FOR TUNING AN ELECTROCHEMICAL CELL STACK

(71) Applicant: Nuvera Fuel Cells, Inc., Billerica, MA (US)

(72) Inventors: Scott Blanchet, Chelmsford, MA (US); Wonseok Yoon, Burlington, MA (US); Pierre-Francois Quet, Somerville, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 721 days.

(21) Appl. No.: 14/330,474

(22) Filed: Jul. 14, 2014

(65) Prior Publication Data

US 2015/0024298 A1   Jan. 22, 2015

Related U.S. Application Data

(60) Provisional application No. 61/856,494, filed on Jul. 19, 2013.

(51) Int. Cl.

| | |
|---|---|
| *C25B 1/08* | (2006.01) |
| *C25B 1/10* | (2006.01) |
| *C25B 15/02* | (2006.01) |
| *C25B 1/02* | (2006.01) |
| *H01M 8/0432* | (2016.01) |

(Continued)

(52) U.S. Cl.
CPC ............... *C25B 15/02* (2013.01); *C25B 1/02* (2013.01); *C25B 1/08* (2013.01); *C25B 1/10* (2013.01); *C25B 9/206* (2013.01); *H01M 8/0432* (2013.01); *H01M 8/04552* (2013.01); *H01M 8/04582* (2013.01); *H01M 8/04701* (2013.01); *H01M 8/04902* (2013.01);

(Continued)

(58) Field of Classification Search
CPC .............. C25B 1/08; C25B 1/10; C25B 15/02
See application file for complete search history.

(56) References Cited

U.S. PATENT DOCUMENTS

| | | |
|---|---|---|
| 2008/0121532 A1 | 5/2008 | Gasda et al. |
| 2012/0315509 A1 | 12/2012 | Gottmann et al. |
| 2015/0299875 A1* | 10/2015 | Lopez De Echazarreta Elvira |

FOREIGN PATENT DOCUMENTS

| | | | |
|---|---|---|---|
| DE | 197 46 616 C1 | 1/1999 | |
| DE | 19746616 C1 * | 1/1999 | ........ H01M 8/04223 |

(Continued)

OTHER PUBLICATIONS

International Search Report and Written Opinion issued in corresponding PCT Application No. PCT/US2014/046861, dated Nov. 4, 2014, 13 pages.

*Primary Examiner* — Nicholas A Smith
(74) *Attorney, Agent, or Firm* — Finnegan, Henderson, Farabow, Garrett & Dunner LLP (57) ABSTRACT

The present disclosure is directed to a method for tuning the performance of at least one electrochemical cell of an electrochemical cell stack. The method includes supplying power to an electrochemical cell stack. The electrochemical cell stack includes a plurality of electrochemical cells. The method further includes monitoring a parameter of at least one electrochemical cell and determining if an electrochemical cell becomes impaired. The method also includes diverting a fraction of the current flow from the impaired electrochemical cell during operation of the electrochemical cell stack.

11 Claims, 7 Drawing Sheets

(51) Int. Cl.
- *H01M 8/04537* (2016.01)
- *H01M 8/04701* (2016.01)
- *H01M 8/04858* (2016.01)
- *C25B 9/20* (2006.01)
- *H01M 8/04955* (2016.01)
- *H01M 8/04223* (2016.01)
- *H01M 8/04664* (2016.01)

(52) U.S. Cl.
CPC .... *H01M 8/04246* (2013.01); *H01M 8/04671* (2013.01); *H01M 8/04955* (2013.01); *Y02E 60/366* (2013.01)

(56) References Cited

FOREIGN PATENT DOCUMENTS

| | | |
|---|---|---|
| DE | 10 2009 026563 A1 | 12/2010 |
| EP | 0 629 015 A1 | 12/1994 |
| EP | 0 834 947 A1 | 4/1998 |

\* cited by examiner

SYSTEM AND METHOD FOR TUNING AN ELECTROCHEMICAL CELL STACK

This application claims the benefit of U.S. Provisional Application No. 61/856,494, filed Jul. 19, 2013, which is incorporated herein by reference.

Embodiments of the present disclosure relate to electrochemical cells, and more specifically, to a system and method for tuning at least one electrochemical cell in an electrochemical cell stack.

Electrochemical cells, usually classified as fuel cells or electrolysis cells, are devices for generating current from chemical reactions, or inducing a chemical reaction using a flow of current. A fuel cell converts the chemical energy of a fuel (e.g., hydrogen, natural gas, methanol, gasoline, etc.) and an oxidant (e.g., air or oxygen) into electricity and waste products of heat and water. An electrolysis cell represents a fuel cell operated in reverse. An electrolysis cell functions as a hydrogen generator by decomposing water into hydrogen and oxygen gases when an external electric potential is applied.

The basic technology of a fuel cell or an electrolysis cell can be applied to electrochemical hydrogen manipulation, such as, electrochemical hydrogen compression, purification, or expansion. An electrochemical hydrogen compressor (EHC), for example, can be used to selectively transfer hydrogen from one side of a cell to another. An EHC can comprise a proton exchange membrane sandwiched between a first electrode (e.g., an anode) and a second electrode (e.g., a cathode). A gas containing hydrogen can contact the first electrode and an electric potential difference can be applied between the first and second electrodes. At the first electrode, the hydrogen molecules can oxidize and the reaction can produce two electrons and two protons. The two protons are electrochemically driven through the membrane to the second electrode of the cell, where they are rejoined by two rerouted electrons and reduced to form a hydrogen molecule. The reactions taking place at the first electrode and second electrode can be expressed as chemical equations, as shown below.

First electrode oxidation reaction: $H_2 \rightarrow 2H^+ + 2e^-$

Second electrode reduction reaction: $2H^+ + 2e^- \rightarrow H_2$

Overall electrochemical reaction: $H_2 \rightarrow H_2$

EHCs operating in this manner are sometimes referred to as hydrogen pumps. When the hydrogen accumulated at the second electrode is restricted to a confined space, the pressure within the space rises, compressing the hydrogen. The maximum pressure or flow rate an individual cell is capable of producing can be limited based on the cell design.

To achieve greater compression or higher pressure, multiple cells can be linked in parallel or in series in an EHC stack to increase the throughput capacity (i.e., total gas flow rate) of an EHC. In operation, an electric current is delivered to the EHC stack to cause the hydrogen in each cell to move from one side of the membrane to the other side. In a stack with more than one cell, the electrical current passes through all the cells, while the voltage applied to the stack is split among the cells in the stack. While ideally the voltage would be split equally among the cells, in actuality the voltage varies between cells. The voltage of a cell can be varied due to bipolar plate corrosion, catalyst degradation, or membrane degradation.

Electrochemical cells having a higher voltage consume more power to compress the same amount of hydrogen. As a consequence, these cells can produce more heat and operate at a higher temperature than other cells operating at lower voltage. The high temperatures can cause the high voltage cells to degrade over time which, in turn, can further increase the voltage of the high voltage cells. This feedback cycle can continue leading to early failure of the cell. Moreover, these degraded cells can lower the efficiency of the overall EHC stack, adversely affecting other cells. While this can be addressed by disassembling the EHC stack and removing the high voltage cells, such methods are costly and problematic as the degraded cells are electrically connected and physically assembled in the stack.

In consideration of the aforementioned circumstances, the present disclosure is directed to a system and method for tuning the performance of at least one cell in an electrochemical cell stack. The system can reduce variations in cell voltages in the electrochemical cell stack during operation. In addition, the system can "tune" the operation of one or more impaired cells while allowing continued operation of the electrochemical cell stack.

At least one aspect of the invention is directed to a method for tuning the performance of at least one electrochemical cell in an electrochemical cell stack. The method can include supplying power to an electrochemical cell stack having a plurality of electrochemical cells. The method can further include monitoring a parameter of at least one electrochemical cell and determining if an electrochemical cell becomes impaired. The method can also include diverting a fraction of the current flow from the impaired electrochemical cell during operation of the electrochemical cell stack.

Another aspect of the invention is directed to an electrochemical cell. The cell can include an active area configured to generate hydrogen and a shunt area outside the boundary of the active area. The shunt area can be configured to receive a shunt.

Yet another aspect of the invention is directed to a system for tuning the performance of an electrochemical cell. The system can include an electrochemical cell stack including two or more electrochemical cells. Each electrochemical cell can include an active area for generating hydrogen and at least one bipolar plate adjacent the active area. The system can further include a shunt configured to be installed between at least a pair of bipolar plates bridging an active area of an impaired electrochemical cell.

Yet another aspect of the invention is directed to a system for tuning the performance of an electrochemical cell stack. The system can include an electrochemical cell stack including two or more electrochemical cells. Each electrochemical cell can include an active area for generating hydrogen; and at least one bipolar plate adjacent the active area. The system can also include bi-directional converters. The bi-directional converters can be arranged to provide current adjustments to at least one electrochemical cell of the electrochemical cell stack.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiment of the invention and together with the description, serve to explain the principles of the invention.

Reference will now be made in detail to the exemplary embodiments of the present disclosure, examples of which are illustrated in the accompanying drawings. Wherever possible, the same reference numbers will be used throughout the drawings to refer to the same or like parts. Although described in relation to electrochemical cells employing hydrogen, it is understood that the systems and methods of the present disclosure can be employed with various types of fuel cells and electrochemical cells, including, but not limited to electrolysis cells, hydrogen purifiers, hydrogen expanders, and hydrogen compressors.

Figure 1:
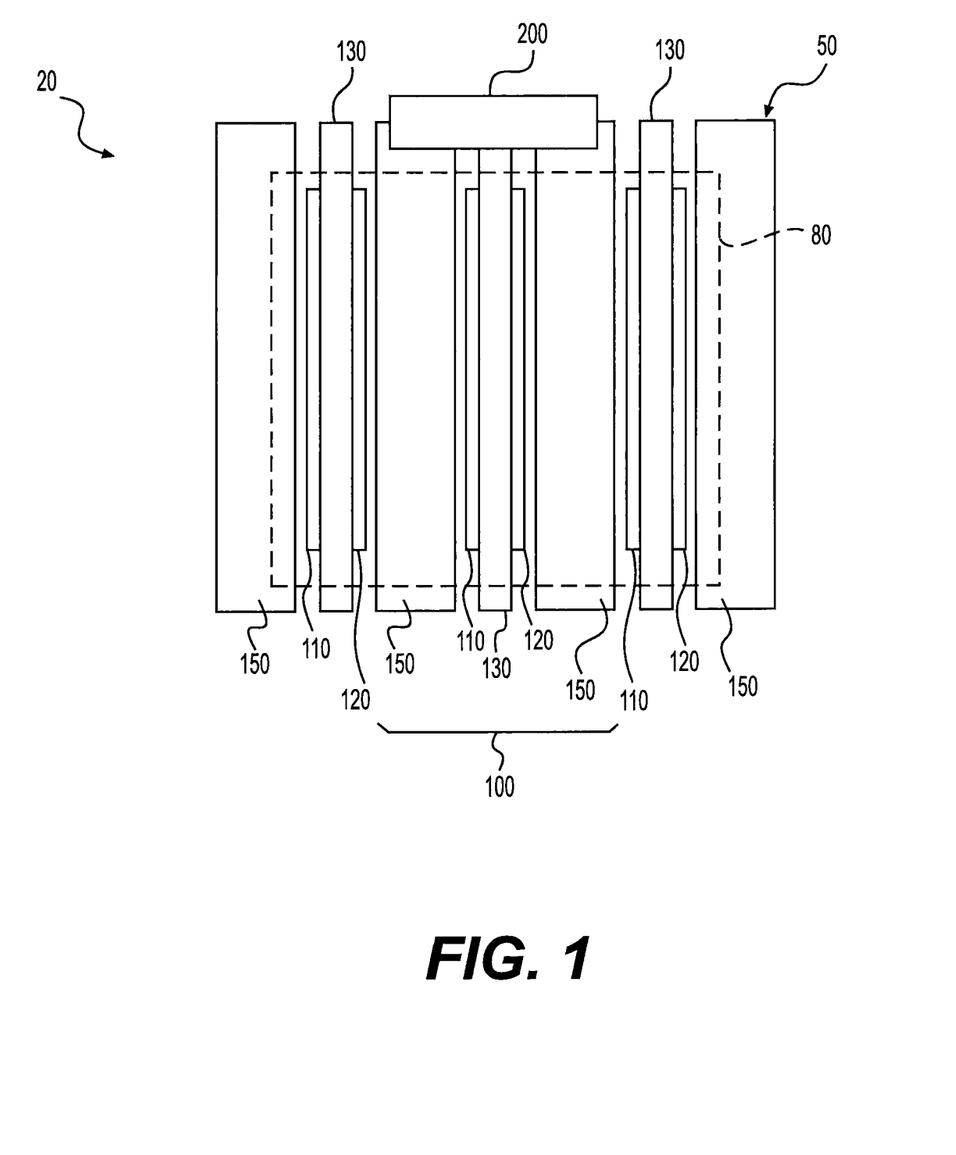
FIG. 1 is a schematic view of a system including an electrochemical cell stack and a shunt resistor, according to an exemplary embodiment.

FIG. 1 shows a side view of an exemplary system 20. System 20 includes an electrochemical cell stack 50 formed of multiple electrochemical cells. Each electrochemical cell 100 includes an active area 80, which is exposed to hydrogen gas. Area 80 encompasses an anode 110, a cathode 120, and a proton exchange membrane (PEM) 130 disposed in between anode 110 and cathode 120. PEM 130 can comprise a pure polymer membrane or composite membrane where other material, for example, silica, heteropolyacids, layered metal phosphates, phosphates, and zirconium phosphates can be embedded in a polymer matrix. PEM 130 can be permeable to protons while not conducting electrons. Anode 110 and cathode 120 can comprise porous carbon electrodes containing a catalyst layer (not shown). The catalyst material, for example platinum, can increase the reaction rate.

Electrochemical cell 100 can further comprise two bipolar plates 150. The two bipolar plates 150 can act as support plates, conductors, provide passages to the respective electrode surfaces for the hydrogen gas, and provide passages for the removal of the compressed hydrogen. Bipolar plates 150 can also include access channels for cooling fluid (i.e., water, glycol, or water glycol mixture). Bipolar plates 150 can be made from aluminum, steel, stainless steel, titanium, copper, Ni—Cr alloy, graphite or any other electrically conductive material.

Multiple electrochemical cells 100 can be linked in series or in parallel to form electrochemical cell stack 50. In the exemplary embodiment, multiple electrochemical cells 100 are stacked in parallel to form a single-stage electrochemical cell stack 50. Electrochemical cell stack 50 can comprise of any suitable number of electrochemical cells 100. For example, in the embodiment shown in FIG. 1, electrochemical cell stack 50 includes three electrochemical cells 100. It is understood, however, that electrochemical cell stack 50 can include a greater or lesser number of electrochemical cells.

Bipolar plates 150 can separate each electrochemical cell 100 from the neighboring cells in electrochemical cell stack 50. In some embodiments, each electrochemical cell 100 in stack 50 comprises two bipolar plates 150, one on each side of the membrane-electrode-assembly (MEA), i.e., if stack 50 comprises n cells, then the total number of bipolar plates 150 in stack 50 is 2n. In some other embodiments, two adjacent electrochemical cells 100 in stack 50 share a bipolar plate 150, i.e., if stack 50 comprises n cells, then the total number of bipolar plates 150 in stack 50 is (n+1).

In operation, according to an exemplary embodiment, hydrogen gas can be supplied to active area 80. A voltage can be applied to electrochemical cell stack 50, so that an electric potential can be applied between anode 110 and cathode 120, wherein the potential at anode 110 is greater than the potential at cathode 120. Further, an electric current is delivered to electrochemical cell stack 50 to cause the hydrogen in each cell to be electrochemically transported or "pumped" through PEM 130 while the electrons are rerouted around PEM 130. At cathode 120, on the opposite side of PEM 130, the transported protons and rerouted electrons are reduced to form hydrogen. As more and more hydrogen is formed at cathode 120, the hydrogen can be compressed and pressurized within a confined space.

As noted above, in an electrochemical cell stack with multiple electrochemical cells, the electric current supplied to the stack passes through all the cells, while the voltage applied to the stack is split among the cells in the stack. While ideally the voltage would be split equally among the cells, in actuality the voltage varies between cells. For example, the cell voltage can vary from 0.01 to 1.0 V/cell in a stack. As a consequence, the heat generation caused by the passage of current through the cell (e.g., ohmic heating) can also vary between cells. The disclosed system can reduce variations in cell voltages and ohmic heating by shunting individual cells operating at high voltages. In the exemplary embodiment, shunting can include use of a shunt resistor 200 of a predetermined (fixed), user selectable, or programmable resistance value.

Figure 2:
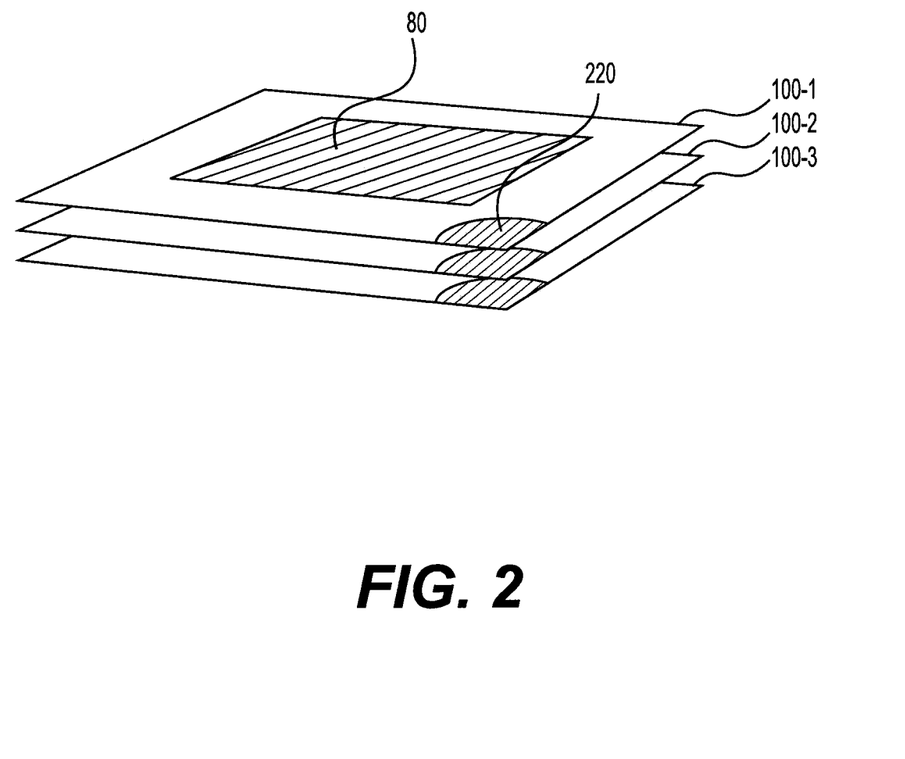
FIG. 2 is a schematic perspective view of the electrochemical cell stack, according to an exemplary embodiment.

FIG. 2 is a schematic view of the exemplary electrochemical cell stack 50. As shown in FIG. 2, each electrochemical cell 100 can include at least one shunt area 220. Shunt area 220 can be located on any portion of electrochemical cell 100 that is accessible from outside of electrochemical cell stack 50. For example, shunt area 220 can be located outside the boundary of active area 80 on a corner or edge of electrochemical cell 100. In some embodiments, each electrochemical cell 100 can include multiple shunt areas 220. In those embodiments, shunt area 220 can be located on some or all corners of electrochemical cell 100. Similarly, it is contemplated that shunt area 220 can be located on some or all edges of electrochemical cell 100.

Figure 3:
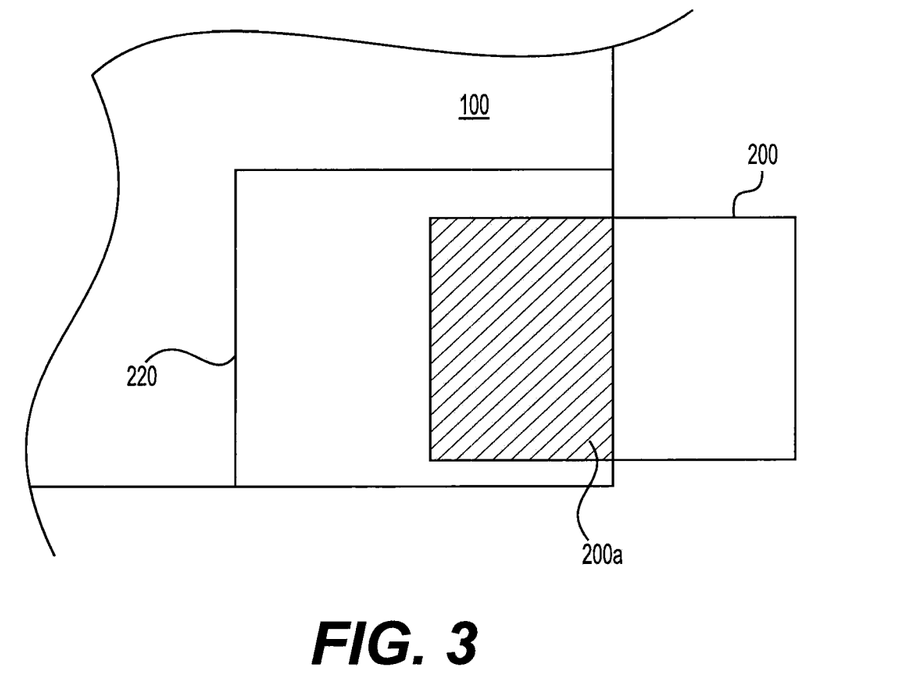
FIG. 3 is a top view of a portion of an electrochemical cell having a shunt area configured to receive the shunt resistor, according to an exemplary embodiment.

Referring to FIG. 3, shunt area 220 can be sized to receive shunt resistor 200. Shunt resistor 200 can be any known low-resistance device configured to divert a fraction of the electric current supplied to active area 80 of an individual electrochemical cell to the neighboring cells. Shunt resistor 200 can be positioned in shunt area 220 of each cell during production, or inserted into shunt area 220 during operation of electrochemical cell stack 50. The insertion can be completed manually or through automated means.

As shown in FIG. 3, shunt resistor 200 can be inserted into or removed from shunt area 220 from outside electrochemical stack 50. It is contemplated that shunt resistor 200 can be fully or partially inserted into shunt area 220. For example, shunt resistor 200 can be partially inserted into shunt area 220 to vary the area of shunt 200a that is in contact with electrochemical cell 100.

Figure 4:
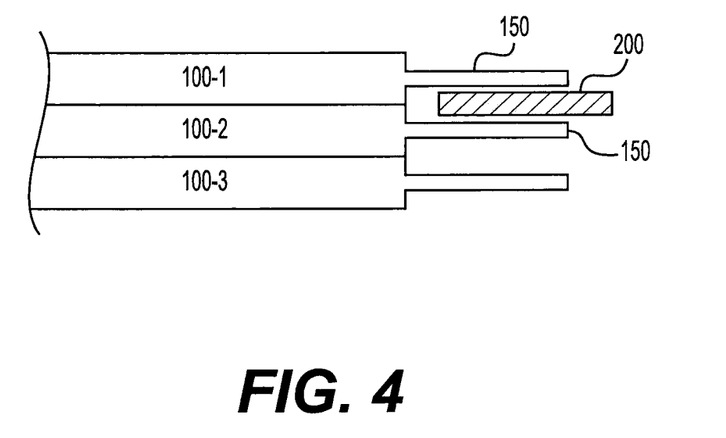
FIG. 4 is a side view of the electrochemical cell stack, having a shunt resistor located between two bipolar plates, according to an exemplary embodiment.

FIG. 4 is a side view of electrochemical cell stack 50. As shown in FIG. 4, when positioned in shunt area 220, shunt resistor 200 can extend between bipolar plates 150 of an individual electrochemical cell. In those embodiments where each electrochemical cell 100 in a stack comprises two bipolar plates, shunt resistor 200 can be placed between the two bipolar plates. In those embodiments (e.g., FIG. 4), where two adjacent electrochemical cells 100 share a bipolar plate, shunt resistor 200 can be placed between the bipolar plates 150 bridging the individual electrochemical cell.

Shunt resistor 200 can be composed of any electrically conductive material such as, for example, copper, aluminum, stainless steel, brass, nickel etc. Shunt resistor 200 can be coated with gold, silver, tin, a semi-conductive material or any other known coating for minimizing the contact resistance or achieving a desired value of resistance. The size, shape, and/or cross-section of shunt resistor 200 can vary. For example, the size and shape of shunt resistor 200 can be sufficient to extend between bipolar plates 150 and direct current flow to neighboring cells. The design of the shunt resistor can also be varied to include spring features to ensure adequate contact is maintained between adjacent plates with variation in plate spacing caused by manufacturing tolerances and thermal expansion of the stack/cells.

In certain embodiments, each electrochemical cell 100 includes one or more alignment devices located on each corner of electrochemical cell 100. The alignment devices can be any known mechanical device configured to link two adjacent electrochemical cells. For example, the alignment devices can comprise at least one fastener (e.g., rod, key, etc.) configured to be received in recesses or locks (not shown) of adjacent bipolar plates 150. It is contemplated that the recesses or locks can be shaped and sized to be complementary to the at least one fastener.

In certain embodiments, shunt resistor 200 can be inserted, in place of the fasteners, into the recesses or locks of bipolar plates 150 bridging an electrochemical cell. In certain other embodiments, shunt resistor 200 can include one or more locking mechanisms to lock or grip onto the fasteners between bipolar plates 150. In alternative embodiments, shunt resistor 200 can be positioned between bipolar plates of the cell, and mechanically fastened to the electrochemical cell stack 50 or a frame containing the stack (not labeled) using traditional fasteners e.g., bolts, screws, etc.

In use, shunt resistor 200 can be used to adjust the voltage across an impaired electrochemical cell. An impaired electrochemical cell can be defined as a cell having a voltage that is higher than a predetermined voltage value. The predetermined voltage value can be, for example, a value selected by the operator, an average voltage per cell of electrochemical cell stack 50, or the minimum voltage of an electrochemical cell 100 in electrochemical cell stack 50. Additionally and/or alternatively, the impaired electrochemical cell can be defined as a cell where the ohmic heating e.g., amount of heat released from the cell due to the passage of current through the cell, is higher than a predetermined ohmic value. The predetermined ohmic value can be, for example, a value selected by the operator, an average amount of heat released per cell of electrochemical cell stack 50, or the minimum heat generation of an electrochemical cell 100 in stack 50.

The impaired cell can also have a temperature, current, resistance, or other parameter associated with the impaired cell that is greater than a threshold value of a healthy cell.

Shunt resistor 200 can have a specific, non-zero resistance value to partially by-pass the impaired electrochemical cell and drop that cell's voltage to the predetermined voltage value. In some embodiments, the resistance value of shunt resistor 200 can be calculated based on a desired resistance and the actual resistance of the impaired electrochemical cell. The general formula for determining the resistance value of the shunt is:

$$R_s = \frac{1}{\frac{1}{R_t} - \frac{1}{R_a}} \quad (1)$$

The desired resistance ($R_t$) of the cell can be the resistance of a cell whose voltage is being matched. The actual resistance ($R_a$) can be calculated based on the voltage of the impaired electrochemical cell before being shunted.

In other embodiments, the resistance of shunt resistor 200 can be calculated such that an amount of heat released from the impaired electrochemical cell can be corrected to be the same as for healthy cells. The formula for determining the resistance value of a shunt to match the ohmic heat generation between the impaired and healthy cells is:

$$R_s = \frac{R_a}{\sqrt{\frac{R_a}{R_t} - 1}} \quad (2)$$

As above, $R_t$ corresponds to a desired resistance of the cell, which can be the resistance of a cell whose voltage is being matched. Similarly, $R_a$ corresponds to an actual resistance of the cell, which can be calculated based on the voltage of the impaired electrochemical cell before being shunted. Using formula (2), the calculated resistance value can be higher than a calculated resistance value derived from the formula (1), discussed above. This can be effective to prolong the life of the poor performing cell while attaining the desired throughput of stack 50 which would otherwise be reduced using formula (1) discussed above.

In certain embodiments, shunt resistor 200 can be a static resistor having a fixed resistance value. In some of these embodiments, the shunt resistor 200 can be partially inserted into shunt area 220. The area 200a of shunt resistor 200 in contact with cell can be adjusted to provide the calculated resistance. In some other embodiments, a user can select a shunt resistor 200 from a plurality of static shunt resistors 200 having a range of resistance values. The selected shunt resistor 200 can have a resistance that matches the calculated resistance, and can be fully inserted into shunt area 220.

Figure 5:
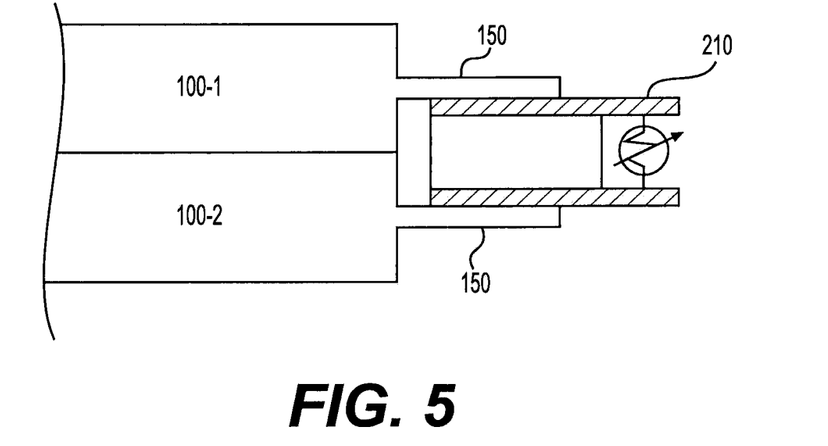
FIG. 5 is a side view of a portion of the electrochemical cell stack having a variable shunt located between two bipolar plates, according to yet another exemplary embodiment.

In certain other embodiments like the exemplary embodiment of FIG. 5, the shunt resistor can comprise a variable shunt resistor 210. Variable shunt resistor 210 can include appropriate electronics and integrated circuits to enable the resistance value to change. Variable shunt resistor 210 can be constructed to include, for example, the electronics and integrated circuits between two contacts made of electrically conductive material. The electronics and circuits can be designed to receive a user input or programmed to have a resistance that varies as a function of the temperature of the impaired electrochemical cell, the supplied current, the voltage across the impaired cell or the predetermined voltage value. In this embodiment, shunt resistor 210 can be positioned in shunt area 220 during production or can be inserted into shunt area 220 during operation of electrochemical cell stack 50. Exemplary variable shunt resistors include bipolar junction transistors (BJT) or junction gate field-effector transistors (JFET).

The resistance values required to shunt the impaired electrochemical cells can vary. It is contemplated that, in some embodiments, the resistivity of electrochemical cells 100 in electrochemical cell stack 50 can range from 5 to 1000 m$\Omega$-cm$^2$. Cells having an active area ranging from 5 to 1000 cm$^2$ can thus have an overall resistance ranging from 0.005 to 200 m$\Omega$. As a current density can range from about 0.05 to about 10 A/cm$^2$, the shunt resistance can vary from about 0.005 to 1000 m$\Omega$.

In yet other embodiments, shunt resistor 200 can have zero resistance and act as a pure conductor. In those embodiments, shunt resistor 200 can be used to divert the total electric current flow supplied to the cell through shunt resistor 200. This may be effective to short circuit the impaired cell and completely isolate the impaired cell from other cells in electrochemical cell stack 50.

Figure 6:
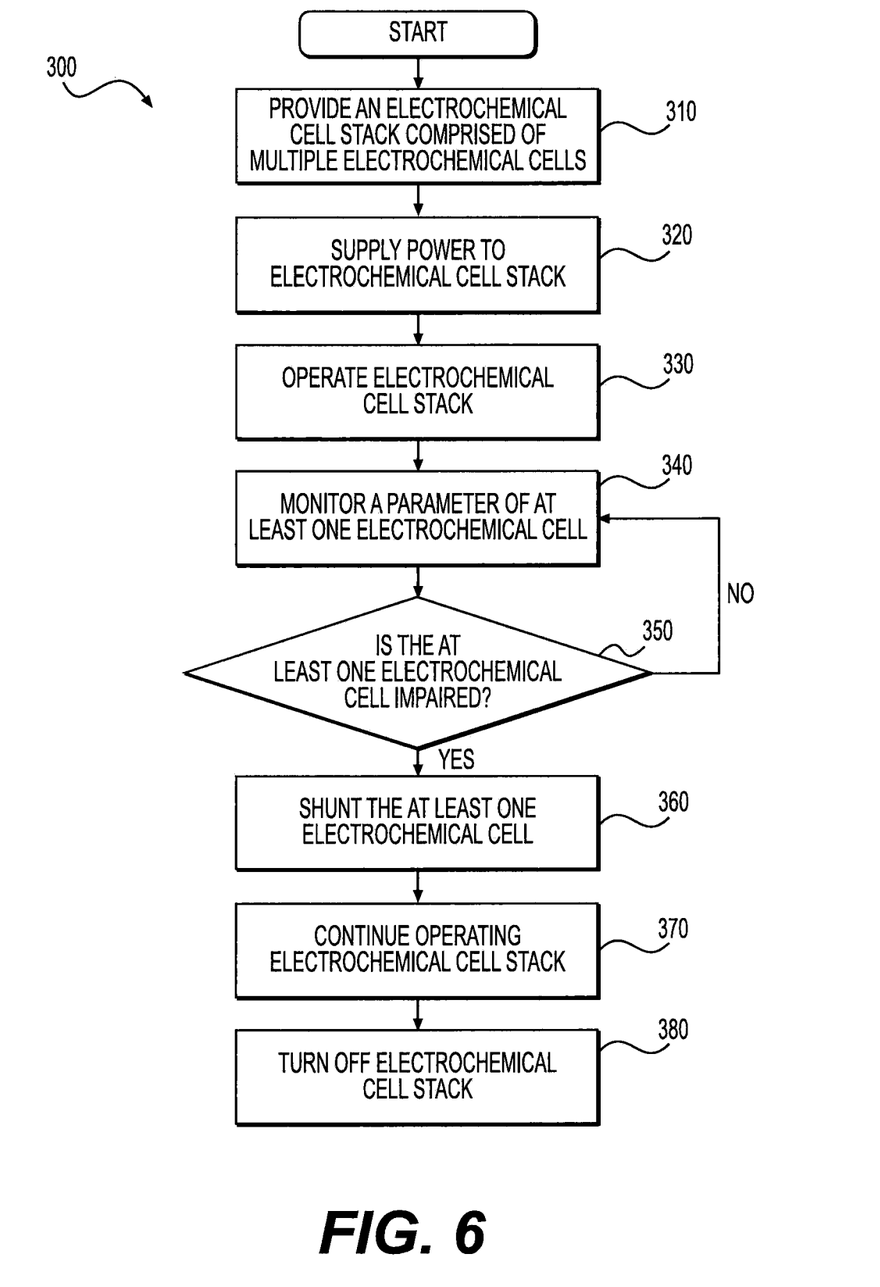
FIG. 6 is a flow diagram illustrating a method of tuning the performance of cells in an electrochemical stack, according to another exemplary embodiment.

FIG. 6 shows a flow chart 300, for a method for tuning the performance of at least one electrochemical cell in an electrochemical cell stack. The method includes providing electrochemical cell stack 50, which can have multiple electrochemical cells 100 as described above (step 310). Next, the method can include supplying hydrogen gas to electrochemical cell stack 50. Power can also be applied to stack 50 (step 320) and operation can begin (step 330).

During operation, a parameter of at least one electrochemical cell 100 can be monitored (step 340). The parameter can be, for example, a voltage across the least one cell, the resistance of the at least one cell, the temperature of the at least one cell, the current density, etc. Monitoring the parameter can be accomplished by a variety of means, e.g., a voltmeter, an ohmmeter, a temperature sensor, etc.

Additionally and/or alternatively a processor can be configured to monitor a parameter of each electrochemical cell of stack 50. The processor can be any known processor including memory. The memory can be any one or more of a variety of types of internal or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory can have stored therein a number of routines that are executable on the processor. The processor apparatus receives input signals from sensors associated with each electrochemical cell and processes output signals sent to an output apparatus.

In one example, a voltmeter could be associated with each cell and configured to read the voltage of each cell during operation of stack 50. If the voltage of an individual cell is higher than a critical voltage set point (step 350), the operator could be alerted to shunt the cell. The critical voltage set point can, for example, correspond to the predetermined voltage value. If the voltage of an individual cell is higher than the predetermined voltage value, the operator can be alerted to reduce the voltage of the impaired cell by shunting the impaired electrochemical cell (step 360). As described above, the resistance value of shunt resistor 200 can be calculated based on a desired resistance and the actual resistance of the cell to be shunted.

In another embodiment, a temperature sensor could be associated with each cell and configured to sense the temperature of each cell during operation of stack 50. If the temperature of an individual cell is higher than a critical temperature set point, the operator could be alerted to shunt the cell. In this embodiment, the resistance value of shunt resistor 200 can be calculated based on formula (2) so that the impaired cell releases the same amount of heat as healthy cells.

Once the resistance value has been calculated, the operator can select a shunt resistor 200 to be positioned in shunt area 220 of the cell to be shunted. As described above, shunt resistor 200 can be a static resistor having a fixed resistance value or a variable shunt resistor 210 programmed to have the calculated resistance value. The selected shunt resistor 200 can then be positioned in shunt area 220 from outside of electrochemical cell stack 50 during operation of electrochemical cell stack 50. Alternatively, if shunt resistor 200 is placed in shunt area during production, the operator can make the shunt resistor operational.

Once in contact with the impaired cell, shunt resistor 200 can divert a fraction of the current supplied to the cell around the cell to neighboring cells. The current that is not diverted through shunt resistor 200 can be used by the cell to pump hydrogen across PEM 130. In this way, the current density and voltage of the cell, as well as the heat generation, can be lowered to repair the performance of the cell. This process can continue throughout the operation of electrochemical cell stack 50 (steps 370 and 380). In some instances, it can be necessary to isolate an electrochemical cell from adjacent electrochemical cells 100. For example, it can be necessary to isolate an electrochemical cell when the cell resistance becomes high due to bipolar plate corrosion, catalyst degradation, membrane degradation, etc., typically caused by continued high voltages over time. In those instances, the critical voltage set point can, for example, correspond to a defective voltage value that is higher than the predetermined voltage value. The defective voltage value is a voltage that can lead to total degradation of the cell. If the voltage of an individual cell is higher than the defective voltage value, the operator can be alerted to isolate the defective cell.

In some embodiments, as a consequence of diverting a fraction of the current, the repaired cell can pump less hydrogen. This, in turn, can reduce the throughput of electrochemical cell stack 50. In these embodiments, the overall current supplied to electrochemical cell stack 50 can be increased to maintain the overall throughput of electrochemical cell stack 50. For example, in an electrochemical cell stack with n cells, the increase in total current to compensate for one shunted cell can be 1/n times the amount of current diverted through shunt resistor 200.

Diverting current through shunt resistor 200 can result in significant ohmic heat generation by shunt resistor 200. This, in turn, can reduce the efficiency of system 20 and increase the load on the cooling components of system 20. In order to overcome such issues, bi-directional converters can be used in lieu of a shunt resistor 200. The bi-directional converters can be configured to adjust current flow through a poor performing cell by diverting current flow around the poor performing cell in electrochemical cell stack 50. By comparison, a system utilizing bi-directional converters can be more efficient than a system utilizing one or more shunt resistors 200.

Figure 7:
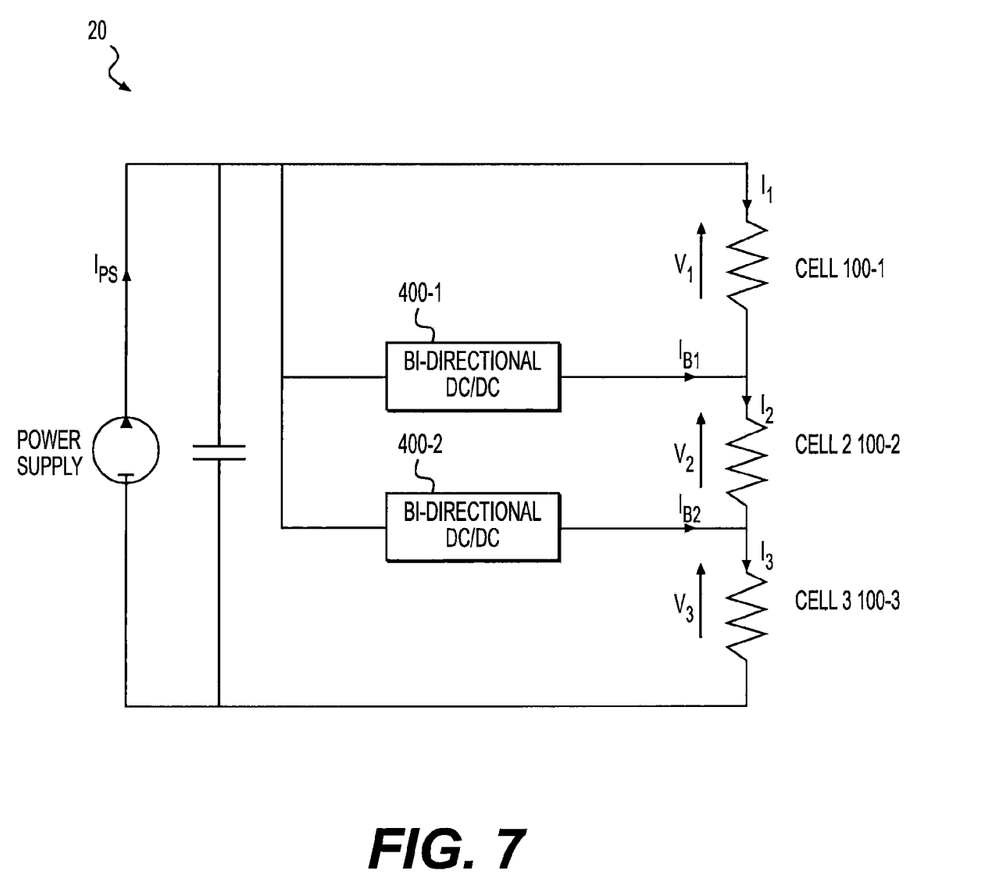
FIG. 7 is a schematic diagram of a system including bi-directional converters, according to an exemplary embodiment.

FIG. 7 is a schematic diagram of an exemplary system 20 including bi-directional converters. As shown in FIG. 7, system 20 includes an external power supply and at least one bi-directional converter 400. The at least one bi-directional converter 400 can be any known circuit or device configured to divert a fraction of the electric current supplied to a cell to neighboring cells. In the exemplary embodiment, the at least one bi-directional converter is a DC to DC converter.

In the exemplary embodiment, the at least one bi-directional converter 400 can include two bi-directional converters arranged to perform current adjustments on an individual electrochemical cell 100. Each bi-directional converter 400 can be arranged between two adjacent electrochemical cells 100 in stack 50 such that if stack 50 comprises n cells, then the total number of bi-directional converters in stack 50 is (n–1). For example, in FIG. 7, system 20 includes a stack 50 having three electrochemical cells 100, and further includes two bi-directional converters 400.

In certain embodiments, it is contemplated that bi-directional converters 400 can be provided in stack 50 and arranged to perform current adjustments on multiple cells at one time.

Figure 8:
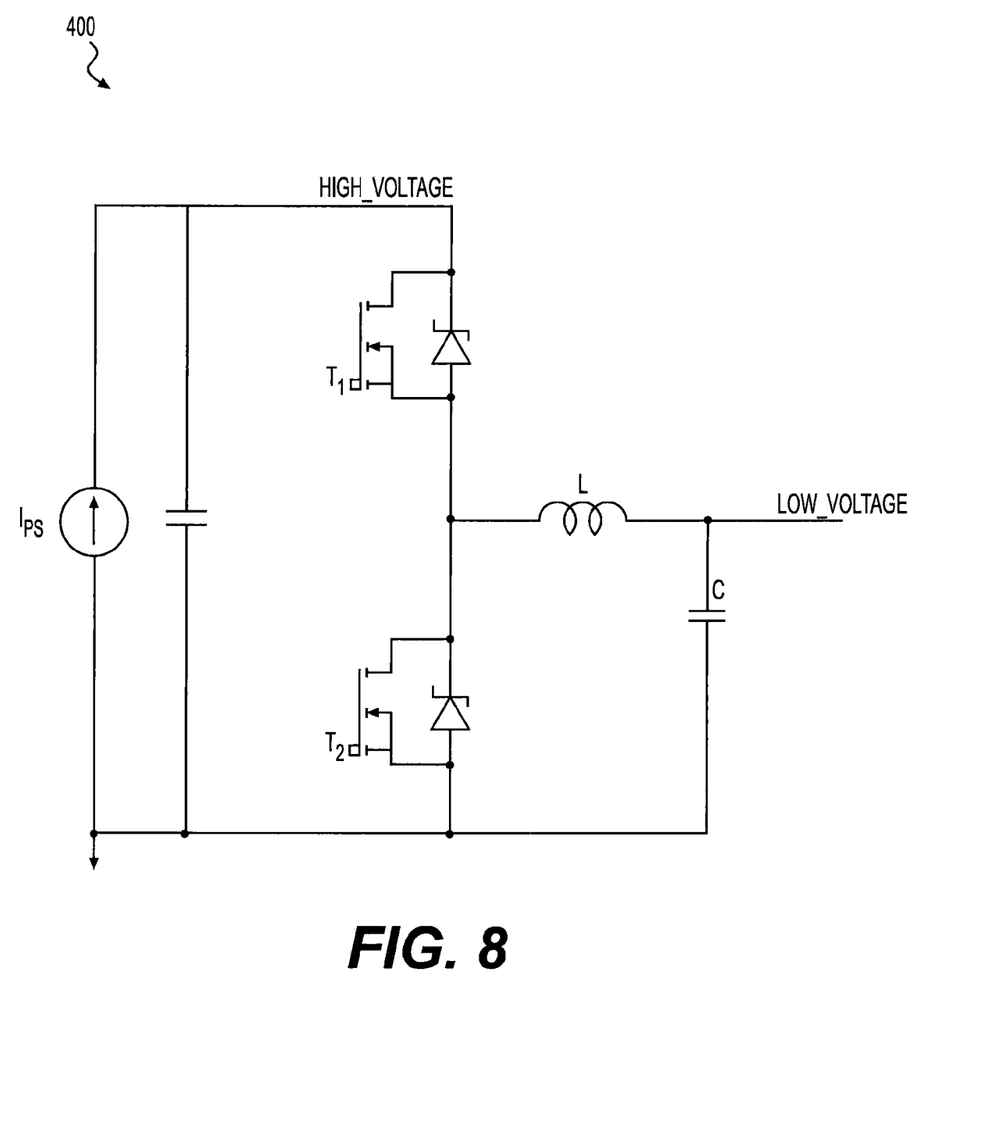
FIG. 8 is a diagram of a bi-directional converter, according to an exemplary embodiment.

An exemplary bi-directional converter 400 is shown in FIG. 8. As shown in FIG. 8, bi-directional converter 400 can include a buck-boost converter circuit. The bi-directional converter 400 can be configured to operate in a boost mode when T1 is open and T2 switches, to divert some current from flowing through the impaired electrochemical cell. The bi-directional converter 400 can be configured to operate in a buck mode when T2 is open and T1 switches, to output current to a neighboring "healthy" cell.

Referring to FIGS. 7 and 8, power supply can provide current to electrochemical stack 50, and bi-directional converters 400 can be configured to adjust the current flow. When stack 50 is healthy, current can originate from the power supply and pass through electrochemical cells 100 of stack 50 without passage through bi-directional converters 400. When it is determined that one or more of the electrochemical cells 100 are impaired, bi-directional converters 400 can be turned on. In certain embodiments, one bi-directional converter 400 can operate in a boost mode to divert some current from the impaired electrochemical cell and another bi-directional converter 400 can operate in buck mode to output the same amount of current to a neighboring electrochemical cell. The amount of current output by each bi-directional converter 400 can be calculated based on the equation below:

$$I_{Bi} = I_{i+1} - I_i \text{ for } i=1, \ldots, n-1 \quad (3)$$

where $I_{Bi}$ corresponds to the current output from the bi-directional converter, and $I_1, I_2, \ldots, I_n$ correspond to the desired cell currents.

As noted above, the disclosed system utilizing one or more bi-directional converters 400 can be more efficient than a system utilizing one or more shunt resistors. When bi-directional converters 400 are in operation, the current output from the power source can be calculated based on the equation below:

$$I_{PS} = I_1 + \sum_{i=1}^{n-1} \eta I_{Bi} \frac{\sum_{j=i+1}^{n} R_j I_j}{\sum_{j=1}^{n} R_j I_j} \quad (4)$$

where $I_{PS}$ corresponds to the current output from a power supply, $R_j$ corresponds to the resistance of cell j, and $\eta$ corresponds to the efficiency of a converter if it is operating in boost mode and the reciprocal of the efficiency of a converter if it is operating in buck mode. Assuming the converters have efficiencies of about 95%, the power loss of the system using the bi-directional converters 400 can be lower than a system using shunt resistors which experience power loss due to ohmic heating.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for tuning the performance of at least one electrochemical cell in an electrochemical cell stack, the method comprising:
    supplying power to an electrochemical cell stack, wherein the electrochemical cell stack includes a plurality of electrochemical cells;
    monitoring a parameter of at least one of the plurality of electrochemical cells;
    determining if an electrochemical cell becomes impaired, and
    diverting a fraction of the current flow from the impaired electrochemical cell during operation of the electrochemical cell stack;
    wherein diverting a fraction of the current flow from the impaired electrochemical cell includes shunting by installing a shunt resistor in a shunt area of the impaired electrochemical cell during operation of the electrochemical cell stack; and
    adjusting an area of the shunt resistor in contact with the impaired electrochemical cell to adjust current flow through the electrochemical cell.

2. The method of claim 1, wherein shunting includes reducing a voltage across the impaired electrochemical cell.

3. The method of claim 1, wherein the parameter is at least one of a voltage, a current, and a temperature.

4. The method of claim 1, wherein determining if an electrochemical cell becomes impaired includes determining if a voltage across the electrochemical cell is higher than a critical voltage set point.

5. The method of claim 4, further including:
    calculating a resistance value that is sufficient to drop the voltage across the impaired electrochemical cell to a predetermined voltage value; and
    selecting a shunt resistor to shunt the impaired electrochemical cell based on the calculated resistance value.

6. The method of claim 5, wherein the predetermined voltage value corresponds to at least one of an average voltage per electrochemical cell of the electrochemical cell stack and a minimum voltage of an electrochemical cell of the electrochemical cell stack.

7. The method of claim 5, wherein the selected shunt resistor has a fixed resistance equal to the calculated resistance value plus or minus 50%.

8. The method of claim 1, wherein determining if an electrochemical cell becomes impaired includes determining if a temperature of the electrochemical cell is higher than a critical temperature set point.

9. The method of claim 8, further including:
    calculating a resistance value that is sufficient to drop the heat generated by the impaired electrochemical cell to a predetermined value; and
    selecting a shunt resistor to shunt the impaired electrochemical cell based on the calculated resistance value.

10. The method of claim 1, wherein shunting the impaired electrochemical cell includes diverting a fraction of the current supplied to the impaired electrochemical cell through a shunt resistor to reduce the heat generated by the impaired electrochemical cell.

11. The method of claim 1, wherein diverting the current from the impaired electrochemical cell includes diverting current with two or more bi-directional converters.

\* \* \* \* \*